Aug. 28, 1923.
H. FORD
AIR WASHER AND FILTER
Filed July 17, 1918
1,466,500
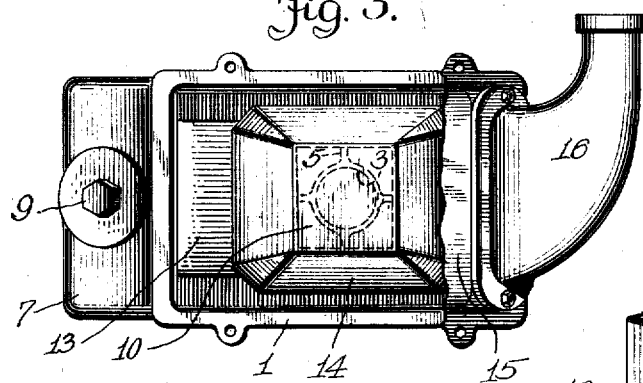
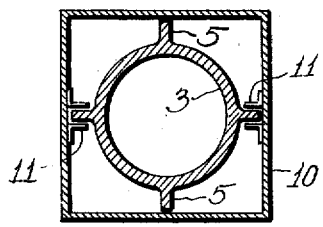
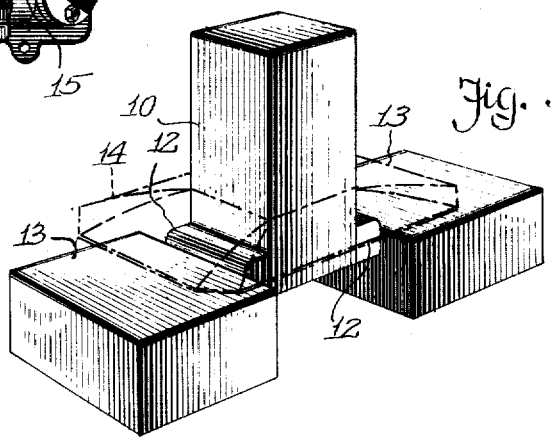
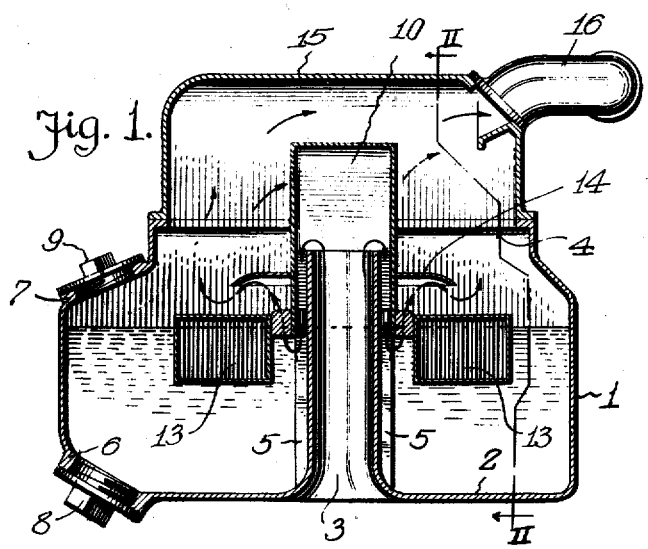
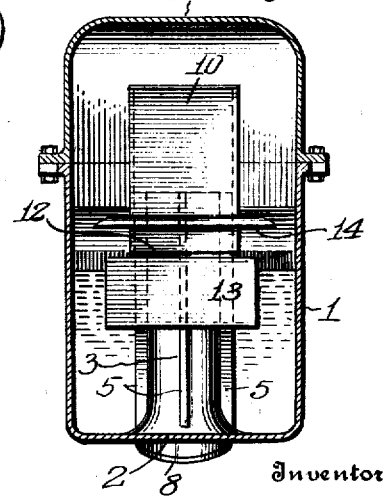
Inventor
Henry Ford.

Patented Aug. 28, 1923.

1,466,500

UNITED STATES PATENT OFFICE.

HENRY FORD, OF DEARBORN, MICHIGAN.

AIR WASHER AND FILTER.

Application filed July 17, 1918. Serial No. 245,428.

*To all whom it may concern:*

Be it known that I, HENRY FORD, a citizen of the United States of America, residing at Dearborn, in the county of Wayne and State of Michigan, have invented certain new and useful Improvements in Air Washers and Filters, of which the following is a specification, reference being had therein to the accompanying drawings.

In the operation of a tractor over roads and fields, the air about the tractor is laden with dust and foreign matter that would cause excessive wear to the pistons and cylinder walls of the tractor engine if taken into the engine cylinders without being washed or filtered, so my invention aims to provide a novel air washer or filter that will positively remove dust and solid matter from the air and in turn load or moisten the air so that it will help to avoid pre-ignition of a gas mixture in the cylinders of the engine.

The air washer includes a novel buoyant air guide, which, irrespective of the depth of the useful volume of water in the washing apparatus, maintains the air guide in a defined relation to the level of the water, so that the end of the air guide will be immersed in the water and thus cause air to be drawn through the water. This novel buoyant air guide, together with other features of the washing apparatus will be hereinafter described and then claimed, and reference will now be had to the drawings, wherein—

Figure 1 is a longitudinal sectional view of the air washing apparatus, illustrating the passage or circulation of air by arrows;

Fig. 2 is a cross sectional view of the same, taken on the line II—II of Fig. 1, showing the air guide in elevation;

Fig. 3 is a plan of the air washing apparatus, partly broken away;

Fig. 4 is a horizontal sectional view of the air guide, and

Fig. 5 is a view of the air guide showing the floats associated therewith.

The air washing apparatus comprises a substantially rectangular bowl or receptacle having the bottom 2 thereof provided with an air intake stand pipe 3 that extends in proximity to an opening 4 in the top of the receptacle. The stand pipe 3 has guide ribs 5, and one end of the receptacle 1 has angularly disposed walls 6 and 7, the former having a drain plug 8 and the latter a filling cap 9. The filling cap 9 permits of water being placed in the receptacle 1 and the drain plug 8 permits of said receptacle being drained and thoroughly cleansed of any foreign matter that may settle on the bottom of the receptacle or be held in suspension by the water therein. With the plugs 8 and 9 in openings that vertically aline, it is possible to place various kinds of cleaning tools in the receptacle so that the receptacle walls may be scraped, cleaned and flushed by water injected into the receptacle.

Over the upper end of the standpipe 3 is an air guide member 10, preferably rectangular in cross section, with the lower end thereof open, and the inner walls thereof provided with opposed guideways 11 for the guide ribs of the stand pipe 3, said ribs and guideways preventing rotation of the air guide member relative to the stand pipe, but not interfering with the reciprocable movement of the air guide member on the standpipe. The lower open end of the air guide member has opposed edges thereof provided with spacing members 12 and suitably attached to said spacing members are floats or buoyant bodies 13 that may be hollow or may be of suitable buoyant material, as cork. The floats 13, are positioned relative to the spacing members 12 and the lower open end of the air guide member 10 so that said guide member will be supported with its lower open end immersed in the water within the receptacle 1, and in consequence of this arrangement it is necessary for air drawn out of the guide member 10 to pass through the water within the receptacle 1 and to a certain extent be purified by said water. Dust and solid matter will be collected by the water, and the air liberated from the water in proximity to the guide member 10 is deflected towards the surface of the water by a deflector 14, carried by the guide member 10, adjacent the floats 13. The deflector affords a rest on which dust and other matter may lodge, if not collected by the water, and should the water become turbulent, by the passage of air therethrough or due to vibrations of the washer when on a tractor, air bubbles will be broken by the deflector and such foreign matter as accumulates on the deflector will be washed into the body of the water and eventually settle on the bottom of the receptacle.

The top of the receptacle 1 has a suitable cover 15 provided with an air outlet or main air supply connection 16 adapted to be connected, directly or indirectly, to the carbureter of an internal combustion engine, so as to supply clean washed air. The air outlet connection 16 is the full width of the cover 15, as shown in Fig. 3 and a suction or reduction of atmospheric pressure in the outlet connection 16 will cause air to be drawn through the stand pipe 3, downwardly through the air guide member 10, into the water within the receptacle, and then out through the cover and the connection 16. In its passage any solid matter carried by the air is removed by the water within the receptacle 1 and the air is sufficiently laden with moisture to avoid pre-ignition of the mixture formed by the carbureter.

In order to obtain the proper operation of the air washer it is necessary that the air should enter the water and pass therethrough at a certain distance below the level thereof, and to compensate for the variations in the water level the floats are employed for supporting the lower end of the air guide member 10 a predetermined distance below the surface of the water relative to the stand pipe, and under no circumstances should the water level be lower than the depth of the floats, as otherwise the air is cut off by the air guide member, causing the engine to miss fire and stop.

One embodiment of my invention has been illustrated, but it is to be understood that the structural elements are susceptible to such variations and modifications as fall within the scope of the appended claim.

What I claim is:

An air washing apparatus comprising a receptacle adapted to contain water, a pipe admitting air to said receptacle above the level of water in said receptacle, guide ribs longitudinally of said pipe, an air guiding member over the upper end of said air admitting pipe, and slidable on said guide ribs with said ribs and member affording air passages from the top of said pipe to the bottom of said member, floats, means connecting the lower end of said air guiding member to said floats, said means maintaining said floats in spaced relation to said air guiding member so that air may pass out of the lower end of said air guiding member and upwardly between said floats, and means on said air guiding member of a greater area than the horizontal area of the space between said floats and having a definite position relative to the surface of water in said receptacle to baffle the washed air and prevent its immediate ascent along the walls of said guiding member.

In testimony whereof I affix my signature in the presence of two witnesses.

HENRY FORD.

Witnesses:
CHAS. E. SORENSEN,
ERNEST KANZLER.